(12) United States Patent
Joyner (10) Patent No.: US 8,264,972 B2
(45) Date of Patent: Sep. 11, 2012

(54) METHOD AND APPARATUS FOR EMULATING NETWORK DEVICES

(75) Inventor: David Joyner, Raleigh, NC (US)

(73) Assignee: Spirent Communications, Inc., Sunnyvale, CA (US)

(*) Notice: Subject to any disclaimer, the term of this patent is extended or adjusted under 35 U.S.C. 154(b) by 403 days.

(21) Appl. No.: 12/130,854

(22) Filed: May 30, 2008

(65) Prior Publication Data

US 2009/0296590 A1    Dec. 3, 2009

(51) Int. Cl.
*G01R 31/08* (2006.01)
(52) U.S. Cl. .................................... 370/250
(58) Field of Classification Search ............. 703/21–28
See application file for complete search history.

(56) References Cited

U.S. PATENT DOCUMENTS

| | | | |
|---|---|---|---|
| 5,812,826 A * | 9/1998 | McLain, Jr. .................. 703/27 |
| 6,252,891 B1 | 6/2001 | Perches |
| 6,654,701 B2 | 11/2003 | Hatley |
| 6,728,929 B1 | 4/2004 | Luong |
| 7,016,340 B1 | 3/2006 | McKinion |
| 7,158,907 B1 | 1/2007 | Soldo |
| 7,162,377 B2 | 1/2007 | Amrod et al. |
| 7,181,360 B1 | 2/2007 | Nikolac et al. |
| 7,272,114 B1 | 9/2007 | Barkan |
| 7,328,144 B1 * | 2/2008 | Grier et al. ................. 703/22 |
| 7,342,897 B1 * | 3/2008 | Nader et al. ............... 370/255 |
| 7,603,266 B2 * | 10/2009 | Ramanathan .............. 703/24 |
| 7,636,653 B1 * | 12/2009 | Chan et al. ................ 703/14 |
| 2002/0156885 A1 * | 10/2002 | Thakkar ...................... 709/224 |
| 2003/0172177 A1 * | 9/2003 | Kersley et al. ............. 709/236 |
| 2004/0190519 A1 | 9/2004 | Dugatkin |
| 2004/0240440 A1 | 12/2004 | Wild et al. |
| 2005/0066086 A1 * | 3/2005 | Ramanathan .............. 710/63 |
| 2005/0259594 A1 * | 11/2005 | Smith ........................ 370/254 |
| 2006/0013252 A1 * | 1/2006 | Smith ........................ 370/466 |
| 2006/0045021 A1 | 3/2006 | Deragon et al. |
| 2008/0031151 A1 | 2/2008 | Williams |
| 2008/0198742 A1 | 8/2008 | Kaempfer |
| 2009/0296590 A1 * | 12/2009 | Joyner ....................... 370/250 |

OTHER PUBLICATIONS

Spirent Communications: Inspired Innovation, Reference Manual: Spirent TestCenter System, Aug. 2006, pp. 1-133.

* cited by examiner

*Primary Examiner* — Chi Pham
*Assistant Examiner* — Kouroush Mohebbi
(74) *Attorney, Agent, or Firm* — Kenta Suzue; Haynes Beffel & Wolfeld LLP (57) ABSTRACT

Methods, apparatuses, data structures, and computer readable media are disclosed that represent network devices with encapsulated protocol stacks communicating via a common physical port. The encapsulated protocol stacks include variable combinations of a multiple encapsulation protocols.

19 Claims, 8 Drawing Sheets

METHOD AND APPARATUS FOR EMULATING NETWORK DEVICES

REFERENCE TO RELATED APPLICATIONS

The application is related to U.S. patent application filed 30 May 2008 titled "METHOD AND DEVICE USING TEST DATA STREAMS BOUND TO EMULATED DEVICES" Ser. No. 12/130,944 and U.S. patent application filed 30 May 2008 titled "REALTIME TEST RESULT PROMULGATION FROM NETWORK COMPONENT TEST DEVICE" Ser. No. 12/130,963. The related applications are incorporated by reference.

BACKGROUND

The technology relates to scalable testing of complex networks and/or complex network devices. Network test equipment to perform such useful scalable testing should emulate a large number and variety of network devices without artificial limits on the overall topology, configuration, and types of traffic.

Traffic types vary by supported network layer, link layer, and physical layer protocols, such as Internet Protocol, Generic Routing Encapsulation, Ethernet, Virtual Local Area Network 802.1q, Multiprotocol Label Switching, Point to Point Protocol over Ethernet, Point to Point Protocol, and Layer 2 Tunneling Protocol, WiMAX, Provider Backbone Bridge 802.1ah, and Asynchronous Transfer Mode. Existing network test equipment places artificial limits on the types of emulated traffic, in particular variable combinations of network layer, link layer, and physical layer protocols.

For example, an earlier TestCenter™ product from Spirent Communications, Inc. emulated only a limited number of fixed combinations of network layer, link layer, and physical layer protocols. These combinations were coded in such a way that the upper layers were aware of the lower layers, and therefore fail to take advantage of layering abstraction. The expected improvements to such a product would preserve the already existing support for the limited number of fixed combinations of network layer, link layer, and physical layer protocols, and gradually supplement this limited support with an additional number of fixed combinations of network layer, link layer, and physical layer protocols, perhaps as technological progress resulted in new network layer, link layer, and physical layer protocols.

In another, especially limited example, Internet Protocol aliasing adds multiple Internet Protocol addresses to a network interface; this example is especially limited because it covers only the single fixed combination of Internet Protocol and Ethernet.

Support for emulating an arbitrarily variable number of combinations of network layer, link layer, and physical layer protocols would be unexpected, because of the significant investment sunk into already existing support for emulating the limited number of fixed combinations of network layer, link layer, and physical layer protocols, and the collectively prohibitive cost of adding incremental support specific to emulating each and every possible combination of network layer, link layer, and physical layer protocols.

SUMMARY

Methods, apparatuses, data structures, and computer readable media are disclosed that represent network devices with encapsulated protocol stacks communicating via a common physical port. The encapsulated protocol stacks include variable combinations of multiple encapsulation protocols.

In some embodiments the physical port is any of: Ethernet, Packet over Synchronous optical networking, Packet over Synchronous Digital Hierarchy, Asynchronous Transfer Mode, and WiMAX.

In some embodiments the encapsulated protocol stacks communicate with transport and higher layers via Internet Protocol supported sufficiently by an operating system without requiring third party code.

In some embodiments the encapsulated protocol stacks communicate with transport and higher layers via Linux PF_PACKET packet interface.

In some embodiments the network devices include at least one of a host, a switch, and a router.

In some embodiments encapsulation protocols of the plurality of encapsulated protocol stacks include at least one of: Internet Protocol, Generic Routing Encapsulation, Ethernet, Virtual Local Area Network 802.1q, Multiprotocol Label Switching, Point to Point Protocol over Ethernet, Point to Point Protocol, and Layer 2 Tunneling Protocol, WiMAX, Provider Backbone Bridge 802.1ah, and Asynchronous Transfer Mode.

Many embodiments represent the plurality of encapsulated protocol stacks with a tree data structure. In some embodiments the tree data structure includes paths between a root node of the tree structure and leaf nodes of the tree data structure, such that paths of the plurality of paths represent encapsulated protocol stacks of the plurality of network devices. Some embodiments have paths between a root node of the tree structure and leaf nodes of the tree data structure, such that nodes along the paths represent encapsulation protocols of the encapsulated protocol stacks. In some embodiments nodes are associated with sets of values specific to packet processing of particular encapsulation protocols. In some embodiments identifying a particular node of the tree data structure has a computational cost on the order of a logarithm of a number of nodes of the tree data structure.

Many embodiments emulate the packet sending process of a network device. Some embodiments process the packet with an encapsulated protocol stack corresponding to the network device, and send the packet via the physical port. Some embodiments create the packet with a payload part and an additional part having space sufficient to store encapsulated protocol data added by encapsulated protocol stack processing.

Many embodiments emulate the packet receiving process of a network device. Some embodiments receive a packet via the physical port, and process the packet with an encapsulated protocol stack corresponding to the network device. Some embodiments identify the encapsulated protocol stack based on at least sets of values corresponding to the encapsulated protocol stack. The sets of values specific to packet processing of particular encapsulation protocols.

Many embodiments emulate the broadcast packet receiving process of a network device. Some embodiments receive either a broadcast packet or a multicast packet via the physical port, process the packet with an encapsulated protocol stack corresponding to the network device, such that the encapsulated protocol stack is in a broadcast domain. This includes identifying the broadcast domain of only a subset of the encapsulated protocol stacks; and based on the broadcast domain decreasing processing of the packet with encapsulated protocol stacks outside of the broadcast domain.

Some embodiments store statistics based on packets processed by the plurality of encapsulated protocol stacks.

Some embodiments emulate network layer communication of the plurality of network devices with a socket Application Programming Interface.

Various methods, apparatuses, data structures, and computer readable media are directed to the disclosed embodiments.

DETAILED DESCRIPTION

Figure 1:
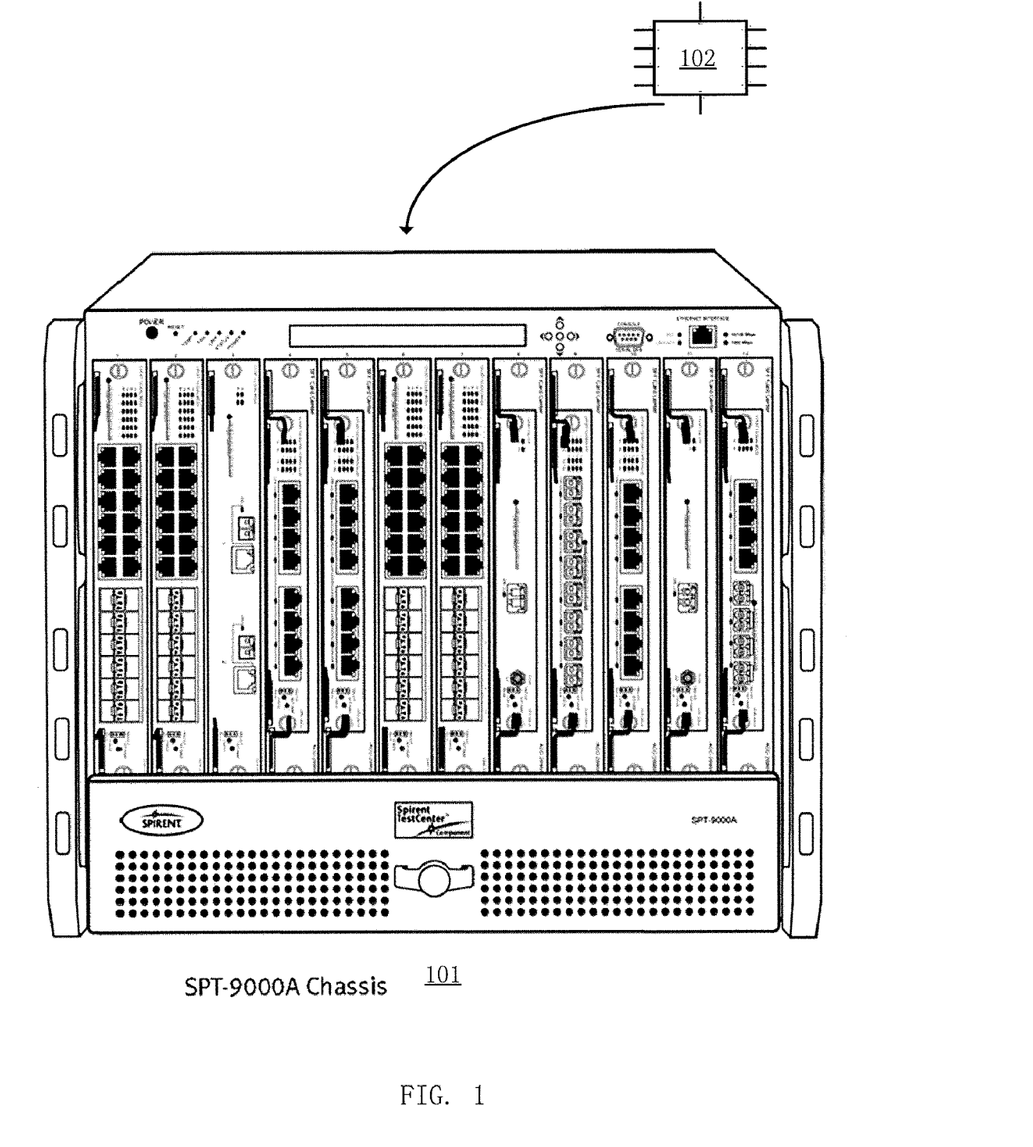
FIG. 1 is shows a Spirent SPT-9000A test chassis, with many physical ports via which multiple network devices and be emulated.

FIG. 1 is shows a Spirent SPT-9000A test chassis 101, with many physical ports via which multiple network devices can be emulated. The test chassis 101 includes at least one memory 102 that stores a tree data structure as discussed herein.

Figure 2:
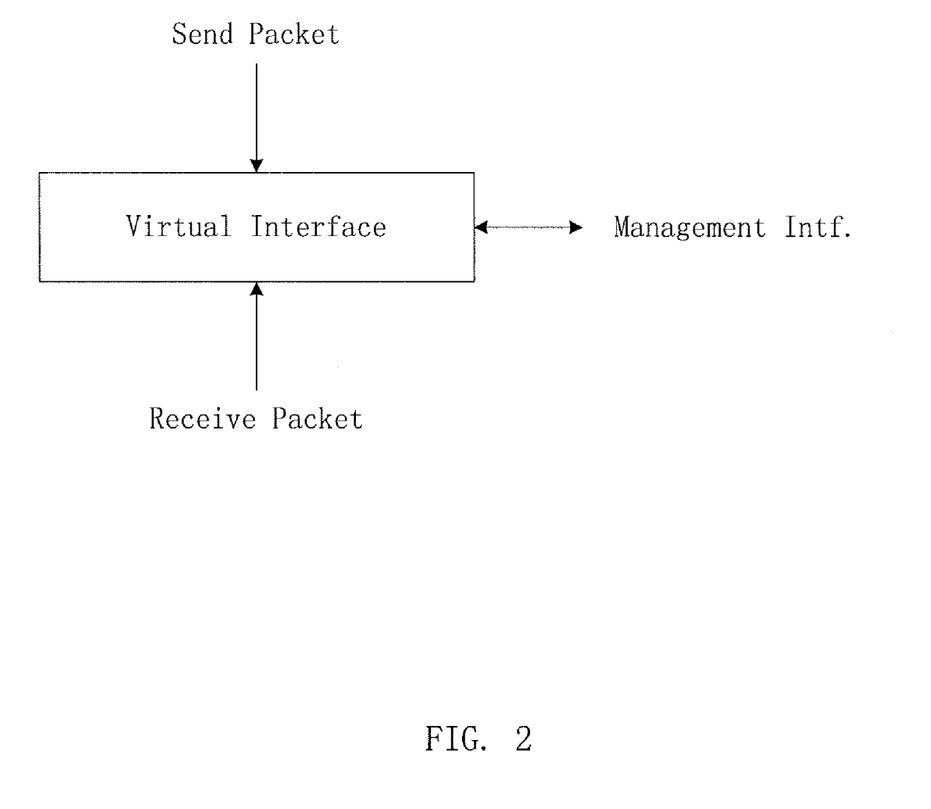
FIG. 2 shows an exemplary encapsulation protocol, where multiple such encapsulation protocols are variably combined to form an encapsulated protocol stack to emulate a network device.

FIG. 2 shows an exemplary encapsulation protocol, where multiple such encapsulation protocols are variably combined to form an encapsulated protocol stack to emulate a network device. Such a variably combinable encapsulation protocol is also referred to as a "virtual interface" or "VIF".

The VIF manages operations such as send a packet and receive a packet. The VIF is a small structure representing a single protocol layer maintained and organized in operating system kernel memory. Examples of protocol layers are Internet Protocol (e.g., versions 4 and 6), Generic Routing Encapsulation, Ethernet (e.g., 10 MBit/s, 100 MBit/s, 1 Gbit/s, 10 Gbit/s), Virtual Local Area Network 802.1q, Multiprotocol Label Switching, Point to Point Protocol over Ethernet, Point to Point Protocol, and Layer 2 Tunneling Protocol (e.g., versions 2 and 3), WiMAX, Provider Backbone Bridge 802.1ah, and Asynchronous Transfer Mode (e.g., adaptation layers 1-5).

The VIF has a protocol value specifying the protocol type. The VIF also has a set of values specific to the protocol type. An exemplary XML template listing such sets of values follows:

```
<?xml version="1.0" standalone="yes" ?>
- <vifs>
- <vif type="ipv4">
- <config>
  <param name="addr" type="ipv4_addr_t" key="yes" />
  <param name="prefix_len" type="uint8_t" key="yes" />
  </config>
  </vif>
- <vif type="ipv6">
- <config>
  <param name="addr" type="ipv6_addr_t" key="yes" />
  <param name="prefix_len" type="uint8_t" key="yes" />
  </config>
  </vif>
- <vif type="gre">
- <config>
  <param name="local_addr" type="ipv4_addr_t" key="yes" />
  <param name="remote_addr" type="ipv4_addr_t" key="yes" />
  <param name="checksum_enable" type="uint8_t" optional="yes" default="1" />
  <param name="inflow_key_enable" type="uint8_t" optional="yes" default="0" />
  <param name="outflow_key_enable" type="uint8_t" optional="yes" default="0" />
  <param name="sequence_enable" type="uint8_t" optional="yes" default="1" />
  <param name="inflow_key" type="uint32_t" optional="yes" base="16" default="0" />
  <param name="outflow_key" type="uint32_t" optional="yes" base="16" default="0" />
  </config>
  </vif>
- <vif type="eth">
- <config>
  <param name="mac" type="mac_addr_t" key="yes" />
  </config>
  </vif>
- <vif type="vlan">
- <config>
  <param name="id" type="uint16_t" key="yes" />
  <param name="tpid" type="uint16_t" optional="yes" base="16" default="0x8100" />
  <param name="priority" type="uint8_t" optional="yes" />
  <param name="cfi" type="uint8_t" optional="yes" />
```

```
        </config>
        </vif>
    - <vif type="mpls">
    - <config>
        <param name="tx_label" type="uint32_t" />
        <param name="rx_label" type="uint32_t" />
        <param name="tx_fec_handle" type="uint32_t" />
        <param name="rx_fec_handle" type="uint32_t" key="yes" />
        <param name="exp" type="uint8_t" optional="yes" base="16" />
        <param name="ttl" type="uint8_t" optional="yes" default="64" />
        <param name="dst_mac" type="mac_addr_t" />
        <param name="ethertype" type="uint16_t" optional="yes" base="16" default="0" />
        </config>
        </vif>
    - <vif type="pppoe">
    - <config>
        <param name="dst_mac" type="mac_addr_t" />
        <param name="code" type="uint8_t" optional="yes" />
        <param name="sid" type="uint16_t" key="yes" />
        </config>
        </vif>
    - <vif type="l2tpv2">
    - <config>
        <param name="use_length" type="uint8_t" optional="yes" default="1" />
        <param name="use_seq" type="uint8_t" optional="yes" default="1" />
        <param name="use_offset" type="uint8_t" optional="yes" default="0" />
        <param name="use_priority" type="uint8_t" optional="yes" default="0" />
        <param name="local_tunnel_id" type="uint16_t" key="yes" />
        <param name="local_session_id" type="uint16_t" key="yes" />
        <param name="remote_tunnel_id" type="uint16_t" optional="yes" default="0" />
        <param name="remote_session_id" type="uint16_t" optional="yes" default="0" />
        <param name="local_port" type="uint16_t" key="yes" optional="yes" default="1701" />
        <param name="remote_port" type="uint16_t" key="yes" optional="yes" default="1701" />
        <param name="remote_addr" type="ipv4_addr_t" key="yes" optional="yes" default="0.0.0.0" />
        </config>
        </vif>
    - <vif type="l2tpv3">
    - <config>
        <param name="direct_ip" type="uint8_t" optional="yes" default="0" />
        <param name="cookie_length" type="uint8_t" optional="yes" default="0" />
        <param name="l2_sublayer_type" type="uint8_t" optional="yes" default="1" />
        <param name="data_seq_level" type="uint8_t" optional="yes" default="2" />
        <param name="pw_type" type="uint16_t" optional="yes" default="5" />
        <param name="session_id" type="uint32_t" key="yes" />
        <param name="cookie" type="uint8_t[8]" optional="yes" />
        <param name="local_port" type="uint16_t" key="yes" optional="yes" default="1701" />
        <param name="remote_port" type="uint16_t" key="yes" optional="yes" default="1701" />
        <param name="remote_addr" type="ipv4_addr_t" key="yes" />
        </config>
        </vif>
    - <vif type="spimax">
    - <config>
        <param name="xcvr_mac" type="mac_addr_t" key="yes" />
        <param name="ss_mac" type="mac_addr_t" />
        <param name="cid" type="uint16_t" key="yes" />
        </config>
        </vif>
    - <vif type="itag">
    - <config>
        <param name="isid" type="uint32_t" key="yes" />
        <param name="dst_mac" type="mac_addr_t" />
        <param name="pcp" type="uint8_t" optional="yes" />
        <param name="dei" type="uint8_t" optional="yes" />
        <param name="nca" type="uint8_t" optional="yes" />
        <param name="res1" type="uint8_t" optional="yes" />
        <param name="res2" type="uint8_t" optional="yes" />
        </config>
        </vif>
    - <vif type="aal5">
    - <config>
```

```
        <param name="vpi" type="uint16_t" key="yes" />
        <param name="vci" type="uint16_t" key="yes" />
        <param name="gfc" type="uint8_t" optional="yes" />
        <param name="pti" type="uint8_t" optional="yes" />
        <param name="clp" type="uint8_t" optional="yes" />
        <param name="uu" type="uint8_t" optional="yes" />
        <param name="cpi" type="uint8_t" optional="yes" />
        <param name="encap" type="uint8_t" />
        <param name="ethertype" type="uint16_t" optional="yes" base="16" default="0" />
      </config>
    </vif>
  </vifs>
```

Figure 3:
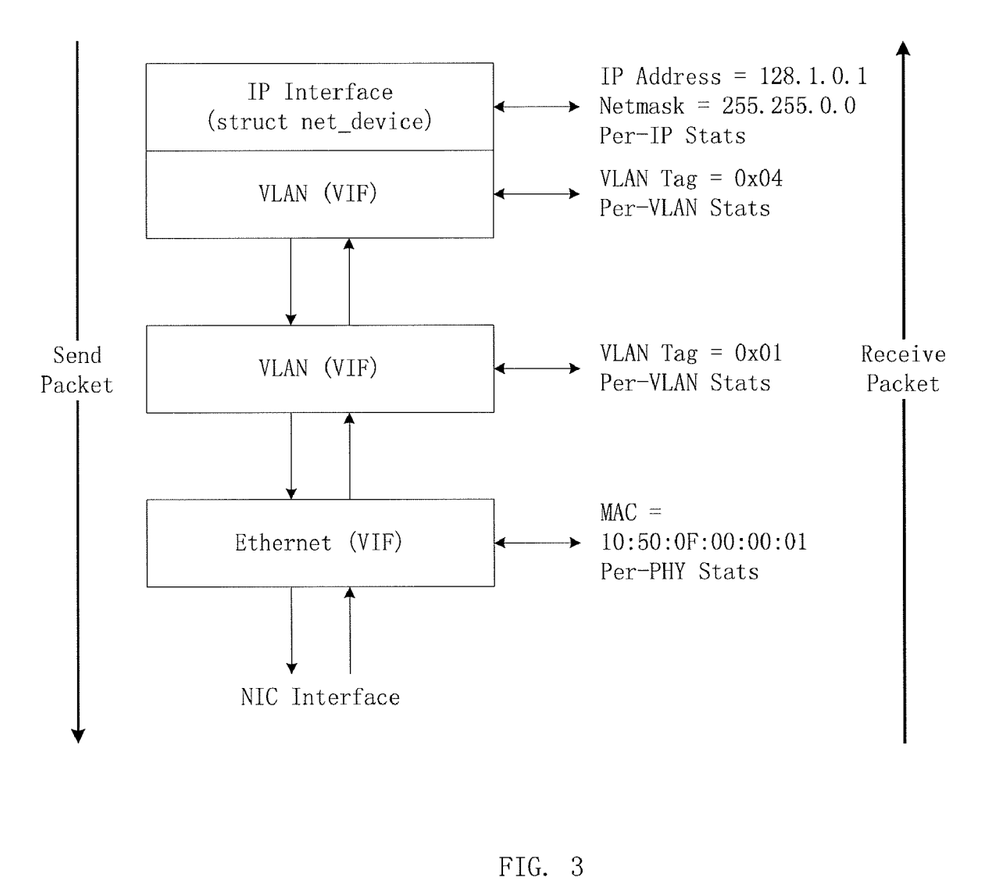
FIG. 3 shows an exemplary encapsulated protocol stack emulating a network device, formed from a variable combination of encapsulation protocols such as shown in FIG. 2.
Figure 4A:
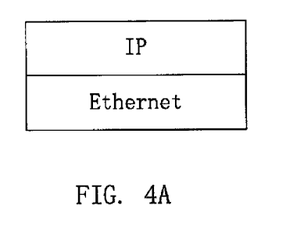
FIGS. 4A-4F show an additional variety of exemplary encapsulated protocol stacks emulating network devices, formed from variable combinations of encapsulation protocols such as shown in FIG. 2.
Figure 4B:
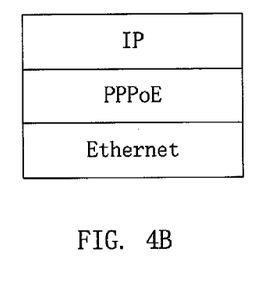
Figure 4C:
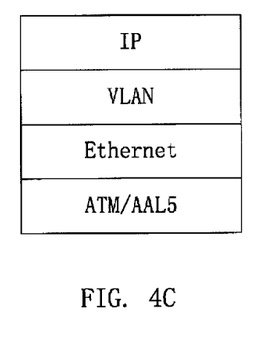
Figure 4D:
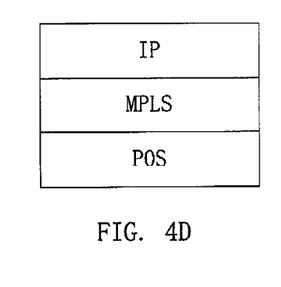
Figure 4E:
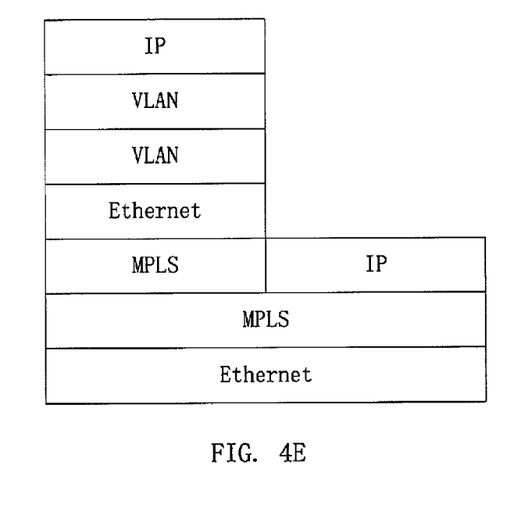
Figure 4F:
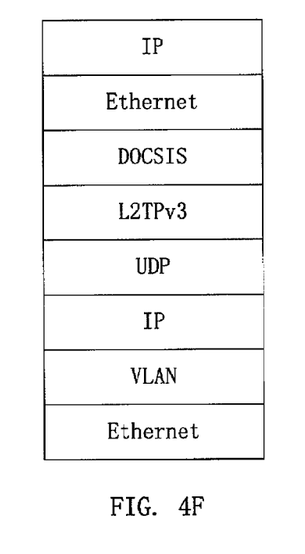

FIG. 3 shows an exemplary encapsulated protocol stack emulating a network device, formed from a variable combination of encapsulation protocols such as shown in FIG. 2.

FIGS. 4A-4E show an additional variety of exemplary encapsulated protocol stacks emulating network devices, formed from variable combinations of encapsulation protocols such as shown in FIG. 2.

Figure 5:
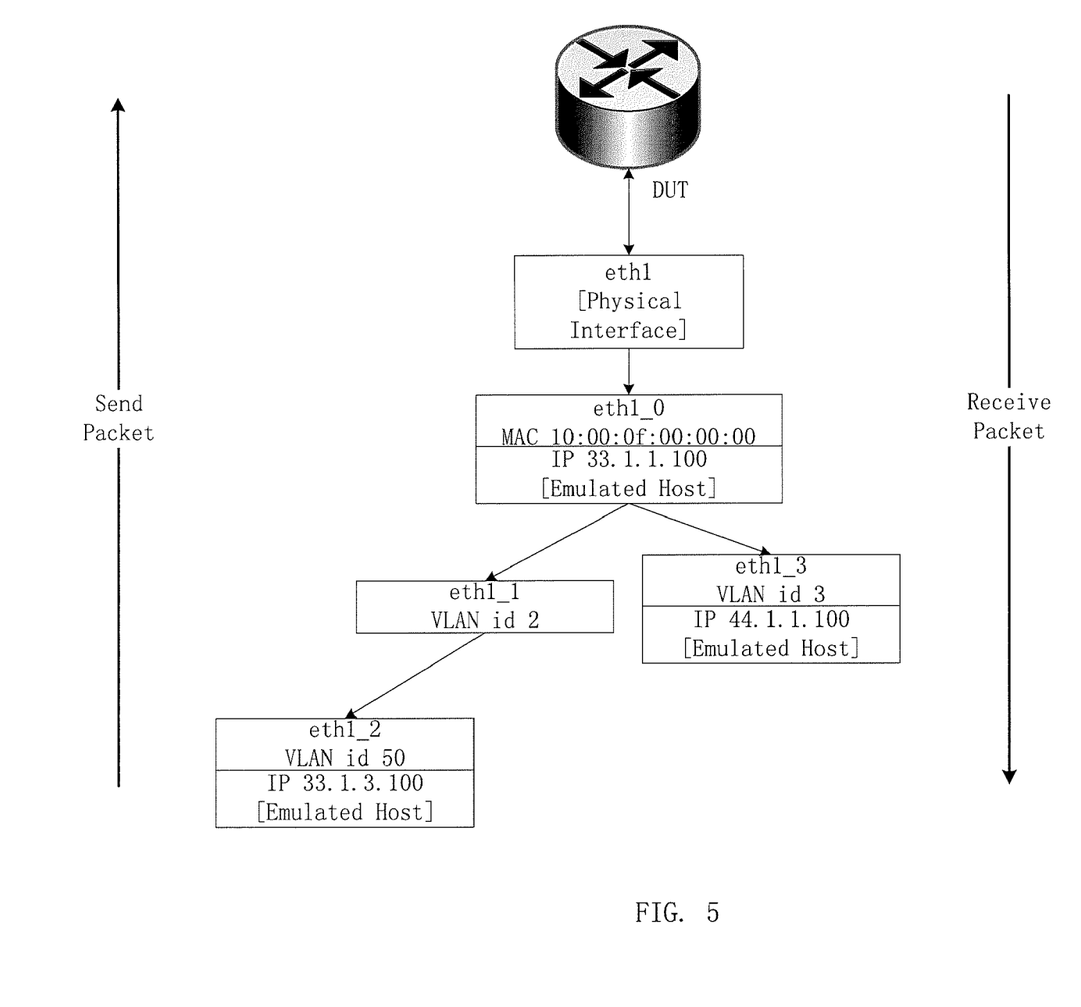
FIG. 5 shows an exemplary data structure representing multiple network devices communicating via a physical port.

FIG. 5 shows an exemplary data structure representing multiple network devices communicating via a physical port.

The tree data structure allocates one node per VIF. The root node of the tree is a special VIF representing the physical interface PHY, such as a port for Ethernet or a port for Packet over SONET/SDH. In this particular view, as a result of tree operations, the tree grows down as children nodes representing encapsulation protocols are added, to emulate network devices that do not exist physically. The tree has a depth equivalent to that of the tallest encapsulated protocol stack.

The process of sending a packet from an emulated device begins at a leaf node of the tree, and the process of receiving a packet at an emulated device begins at the root node of the tree. All children nodes of a particular node are unique, to prevent ambiguity about the recipient emulated device. In one embodiment, to ensure such uniqueness, the protocol-specific set of values associated with each child node is unique with respect to the protocol-specific set of values associated with all other peer nodes. A simple embodiment just assigns a unique name.

At any given node, the collection of child nodes has properties of a red black tree, such that the node can have any number of children. Accordingly, child lookup has efficient performance of O(log$_2$ n), with n being the number of potentially consulted nodes in the lookup.

Figure 6:
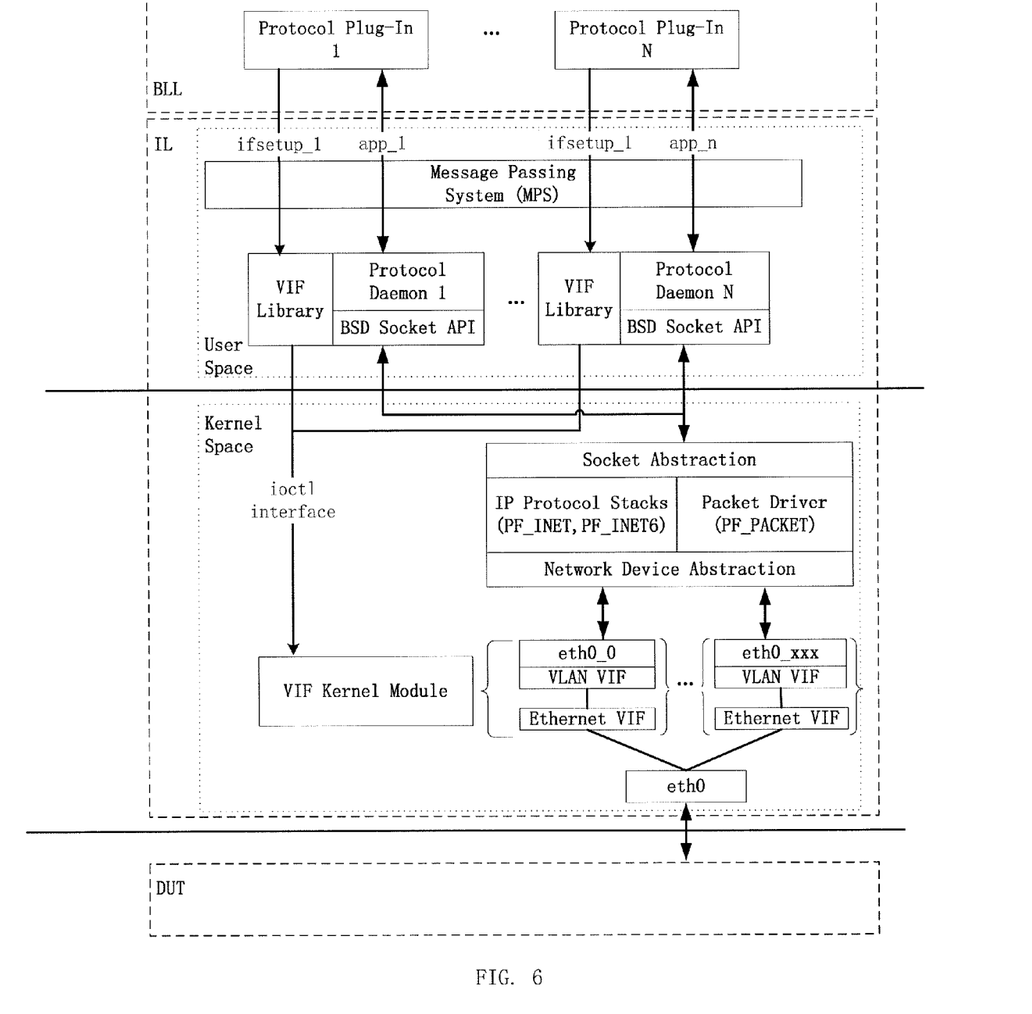
FIG. 6 shows an exemplary architectural diagram indicating the interaction of an exemplary data structure representing multiple network devices communicating via a physical port, with an operating system of test equipment, and with another computer having a user interface.

FIG. 6 shows an exemplary architectural diagram indicating the interaction of an exemplary data structure representing multiple network devices communicating via a physical port, with an operating system of test equipment, and with another computer having a user interface.

Shown are the business layer logic (BLL) and instrument layer logic (IL) of a test device communicating with a device under test (DUT). The test device includes hardware and software that implement features described herein. The test device may include one or more of logic arrays, memories, analog circuits, digital circuits, software, firmware and processors such as microprocessors, field programmable gate arrays (FPGAs), application-specific integrated circuits (ASICs), programmable logic devices (PLDs) and programmable logic arrays (PLAs). The hardware may be found in the chassis, card rack or integrated unit. It may include or operate with the console or the general purpose computer in communication with the test device. The test device may include a number of separate units that are clustered together, as shown in FIG. 1, or remote from one another. For some levels of testing and some components of an overall test setup, the test control may be implemented on a computer such as a personal computer, server or workstation.

Typically, the BLL has been hosted on a laptop or PC and provided a user interface and control for a test chassis that included both general purpose CPUs and FPGAs. The FPGAs have been dynamically configured to optimize test packet generation. Some combination of hardware supports the BLL and IL logic.

The IL logic depicts an operating system view divided into kernel space and user space. An exemplary division reserves kernel space for operating system kernel, kernel extensions, and some device drivers and permits user mode applications to reside in user space.

An ifsetup message sets up the interface, and is shown in the figure, sending requests from a protocol plug-in in BLL, to a VIF library in user space, which in turn makes ioctl system calls to a dynamically loaded VIF kernel module in kernel space.

A list of the operations that the kernel module's interface manager accept from user space, follows:
  Create VIF
  Destroy VIF
  Enable/Disable VIF (enabling a VIF in this sense causes a net_device structure to be allocated and made visible to the rest of the Linux O/S—typically for leaf node VIF's)
  Get VIF Status
  Get VIF Configuration
  Modify VIF Configuration
  Get VIF Children
  Reset VIF Statistics The kernel module creates the tree data structure as discussed in FIG. 5, shown with a VIF representing the physical port as the root node. Also as shown, the kernel module does not have to create a net_device at each layer, and instead creates one net_device (e.g., eth0_0, . . . , eth0_xxx) at each leaf node, which supports the BSD socket API and can take advantage of any built-in command line utilities of the operating system. Because the kernel model sandwiches protocol specific VIFs, the kernel model hides complexity of the encapsulated protocols from the OS and upper layer utilities in the IL and BLL.

The operating system is non-limiting, and can be, e.g., embedded Linux, other Unix derivatives such as BSD, VxWorks, IOS by Cisco, etc.

The process of sending a packet is described as follows. In the IL, the data to be sent is generated by a protocol daemon. The socket API communicates the data to be sent to kernel space. Then within kernel space, the socket abstraction, one of the protocol stacks (IP protocol stacks PF_INET or PF_I-NET, packet driver PF_PACKET) sends a partially built packet from the emulated device. As the partially built packet is processed by each encapsulated protocol of the emulated device, protocols headers are added until the packet is complete, and ready to send via the physical port.

Some embodiments create partly formed packets with sufficient headroom to store additional header data added by each subsequent encapsulated protocol, to prevent wasteful copying and reallocating of memory.

Some embodiments allow the MPLS encapsulated protocol, PPPoE encapsulated protocol and the Ethernet encapsulated protocol to determine and communicate the destination address of a peer.

The process of receiving a packet follows oppositely ordered iterative steps of the sending process. However, the receive process has the ambiguity about how a parent node determines which of multiple children nodes is an immediate destination following any processing by the parent node. This ambiguity is resolved by the VIF kernel module with the unique node data discussed in connection with FIG. 5. The particular encapsulated protocol of a candidate child node extracts key fields from the packet. If comparison between key fields of the received packet matches the unique data of a child node, the encapsulated protocol continues processing such as validating the packet and removing header data corresponding to that encapsulated protocol. However, if the match process fails, then the packet is discarded.

Broadcast/multicast packets are treated specially to prevent the prohibitive expense of repeated processing of the same packet by a large number of emulated devices.

In one mechanism, a special case handler determines the broadcast domain of the packet, and sends copies of the packet to only nodes that belong to that broadcast domain.

In another mechanism, for Ethernet VLAN 802.1q, a hash is consulted which was developed to determine whether any leaf nodes in the tree belong to the same broadcast domain. This hash prevents traversal of the entire tree.

Several IPv4 special rules are as follows:

1) Broadcast IPv4 packet: IPv4 broadcasts are received one time at the first VIF in a broadcast domain.

2) Multicast IPv4 packet: IPv4 multicasts are receive at all VIFs in the broadcast domain.

3) Unicast IPv4 packet: IPv4 unicasts are received by only the VIF with that address. Besides eliminating non-broadcast domain packets, this eliminates other leaf VIFs without that IP address.

These rules apply to IPv6.

ARP (Address Resolution Protocol) has a special rule as well. An ARP broadcast is received only at VIFs with matching IP addresses.

Some operating systems such as Linux allow the maintenance a net_device multicast list. The multicast list may be consulted to eliminate VIFs outside that broadcast domain.

Figure 7:
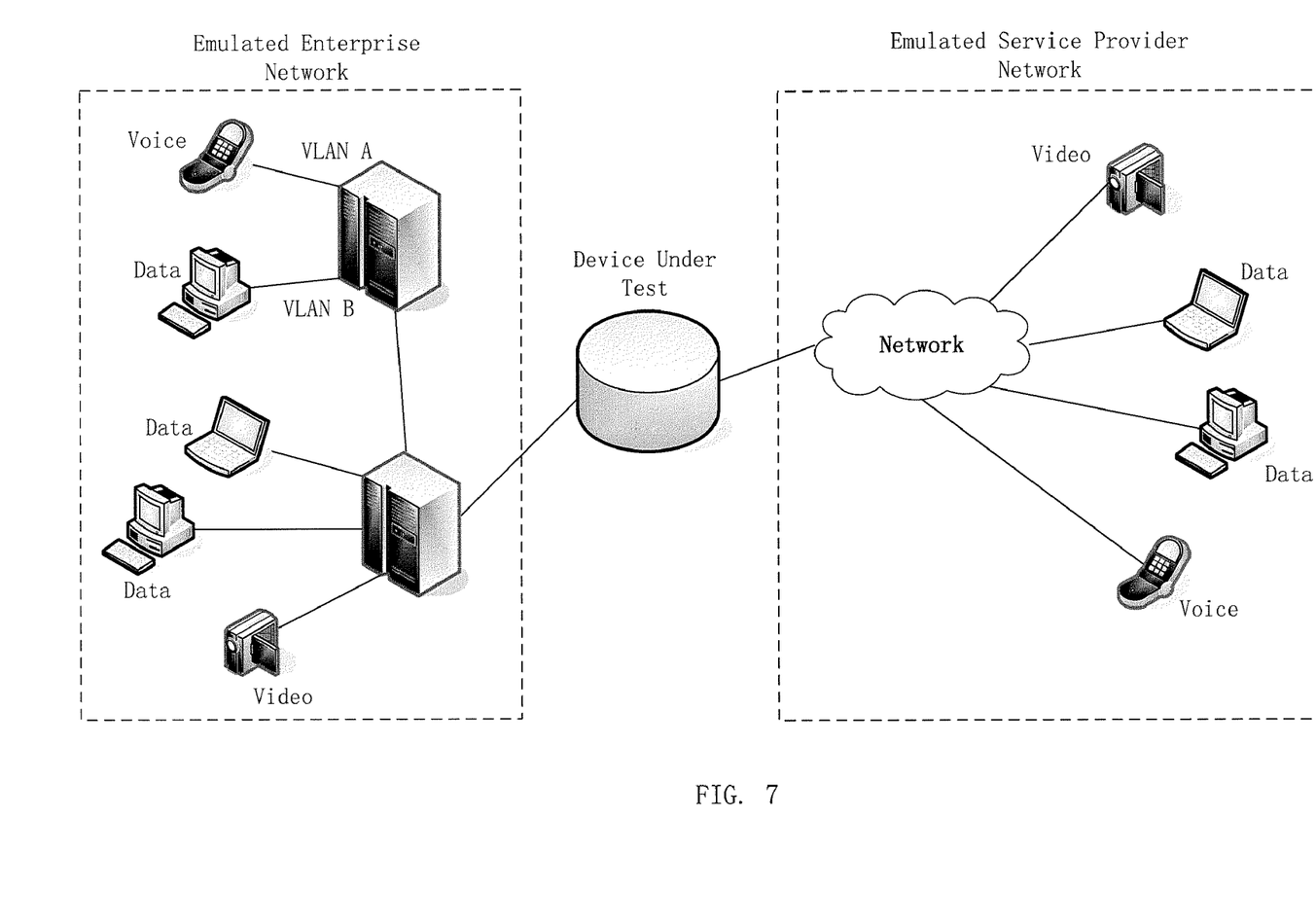
FIG. 7 shows an exemplary network device topology with groups of network devices communicating traffic, all emulated by variable combinations of encapsulation protocols.

FIG. 7 shows an exemplary network device topology with groups of network devices communicating traffic, all emulated by variable combinations of encapsulation protocols.

Figure 8:
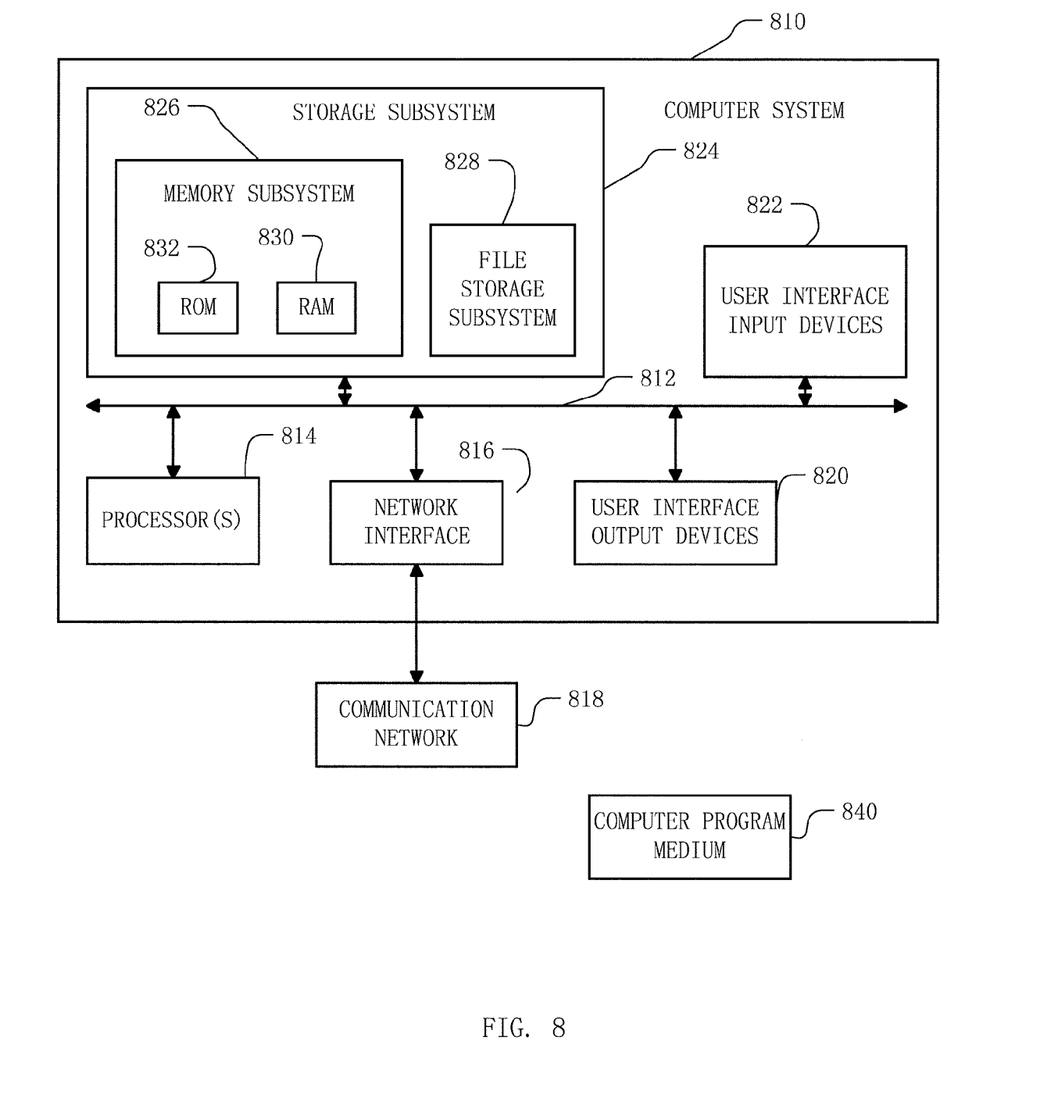
FIG. 8 shows a block diagram of an exemplary computer system.

FIG. 8 shows a block diagram of an exemplary computer system 810 suitable for use with embodiments of the technology, such as at the BLL or IL. Computer system 810 typically includes at least one processor 814 which communicates with a number of peripheral devices via bus subsystem 812. These peripheral devices may include a storage subsystem 824, comprising a memory subsystem 826 and a file storage subsystem 828, user interface input devices 822, user interface output devices 820, and a network interface subsystem 816. The input and output devices allow user interaction with computer system 810. Network interface subsystem 816 provides an interface to outside networks, including an interface to communication network 818, and is coupled via communication network 818 to corresponding interface devices in other computer systems. Communication network 818 may comprise many interconnected computer systems and communication links. These communication links may be wireline links, optical links, wireless links, or any other mechanisms for communication of information. While in one embodiment, communication network 818 is the Internet, in other embodiments, communication network 818 may be any suitable computer network.

User interface input devices 822 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 810 or onto computer network 818.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores the basic programming and data constructs that provide the functionality of certain embodiments. For example, the various modules implementing the functionality of certain embodiments may be stored in storage subsystem 824. These software modules are generally executed by processor 814.

Memory subsystem 826 typically includes a number of memories including a main random access memory (RAM) 830 for storage of instructions and data during program execution and a read only memory (ROM) 832 in which fixed instructions are stored. File storage subsystem 828 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 828.

Bus subsystem 812 provides a mechanism for letting the various components and subsystems of computer system 810 communicate with each other as intended. Although bus subsystem 812 is shown schematically as a single bus, alternative embodiments of the bus subsystem may use multiple busses.

Computer readable medium 840 can be a medium associated with file storage subsystem 828, and/or with network interface 816. The computer readable medium can be a hard disk, a floppy disk, a CD-ROM, an optical medium, removable media cartridge, or electromagnetic wave. The computer readable medium 840 is shown storing program instructions performing the described technology.

Computer system 810 itself can be of varying types including a personal computer, a portable computer, a workstation, a computer terminal, a network computer, a television, a mainframe, or any other data processing system or user device. Due to the ever-changing nature of computers and networks, the description of computer system 810 depicted in FIG. 8 is intended only as a specific example for purposes of illustrating the preferred embodiments. Many other configurations of computer system 810 are possible having more or less components than the computer system depicted in FIG. 8.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method of network emulation, comprising:
emulating, on a network hardware device, a plurality of network devices with a plurality of encapsulated protocol stacks, the plurality of network devices communicating with network hardware under test external to the network hardware device via a physical port of the network hardware device, the plurality of encapsulated protocol stacks comprising variable combinations of a plurality of encapsulation protocols, the plurality of encapsulated protocol stacks emulated with a tree data structure including a plurality of paths between a root node of the tree structure and leaf nodes of the tree data structure, such that nodes along the plurality of paths emulate encapsulation protocols of the plurality of encapsulated protocol stacks, and said nodes are associated with sets of values specific to packet processing of particular encapsulation protocols of the variable combinations.

2. The method of claim 1, wherein the physical port is any of: Ethernet port, Packet over Synchronous optical networking, Packet over Synchronous Digital Hierarchy, Asynchronous Transfer Mode, and WiMAX.

3. The method of claim 1, wherein the plurality of encapsulated protocol stacks communicates with transport and higher layers via Internet Protocol, the Internet Protocol supported sufficiently by an operating system.

4. The method of claim 1, wherein the plurality of encapsulated protocol stacks communicates with transport and higher layers via PF_PACKET packet interface.

5. The method of claim 1, wherein the plurality of network devices includes at least one of a host, a switch, and a router.

6. The method of claim 1, wherein encapsulation protocols of the plurality of encapsulated protocol stacks include at least one of: Internet Protocol, Generic Routing Encapsulation, Ethernet, Virtual Local Area Network 802.1q, Multiprotocol Label Switching, Point to Point Protocol over Ethernet, Point to Point Protocol, and Layer 2 Tunneling Protocol, WiMAX, Provider Backbone Bridge 802.1ah, and Asynchronous Transfer Mode.

7. The method of claim 1, wherein
the tree data structure includes a plurality of paths between the root node of the tree structure and leaf nodes of the tree data structure, such that paths of the plurality of paths emulate encapsulated protocol stacks of the plurality of network devices.

8. The method of claim 1, wherein
identifying a particular node of the tree data structure has a computational cost on the order of a logarithm of a number of nodes of the tree data structure.

9. The method of claim 1, further comprising:
emulating a packet sending process of a network device of the plurality of network devices, comprising:
processing the packet with an encapsulated protocol stack of the plurality of encapsulated protocol stacks, the encapsulated protocol stack corresponding to the network device; and
sending the packet via the physical port.

10. The method of claim 1, further comprising:
emulating a packet sending process of a network device of the plurality of network devices, comprising:
creating the packet with a payload part and an additional part having space sufficient to store encapsulated protocol data added by encapsulated protocol stack processing;
processing the packet with an encapsulated protocol stack of the plurality of encapsulated protocol stacks, the encapsulated protocol stack corresponding to the network device, including:
sending the packet via the physical port.

11. The method of claim 1, further comprising:
emulating a packet receiving process of a network device of the plurality of network devices, comprising:
receiving a packet via the physical port; and
processing the packet with an encapsulated protocol stack of the plurality of encapsulated protocol stacks, the encapsulated protocol stack corresponding to the network device.

12. The method of claim 1, further comprising:
emulating a packet receiving process of a network device of the plurality of network devices, comprising:
receiving a packet via the physical port; and
processing the packet with an encapsulated protocol stack of the plurality of encapsulated protocol stacks, the encapsulated protocol stack corresponding to the network device, comprising:
identifying the encapsulated protocol stack of the plurality of encapsulated protocol stacks based on at least sets of values corresponding to the encapsulated protocol stack, the sets of values specific to packet processing of particular encapsulation protocols.

13. The method of claim 1, further comprising:
emulating a packet receiving process of a network device of the plurality of network devices, comprising:
receiving a packet being either a broadcast packet or a multicast packet via the physical port; and
processing the packet with an encapsulated protocol stack of the plurality of encapsulated protocol stacks, the encapsulated protocol stack corresponding to the network device, the encapsulated protocol stack in a broadcast domain, comprising:
identifying the broadcast domain comprising only a subset of encapsulated protocol stacks of the plurality of encapsulated protocol stacks; and
based on the broadcast domain, decreasing processing of the packet with encapsulated protocol stacks outside of the broadcast domain.

14. The method of claim 1, further comprising:
storing statistics based on packets processed by the plurality of encapsulated protocol stacks.

15. The method of claim 1, further comprising:
emulating network layer communication of the plurality of network devices with a socket Application Programming Interface.

16. The method of claim 1, wherein encapsulation protocols of the plurality of encapsulated protocol stacks are abstracted such that a particular encapsulation protocol is unaware of other encapsulation protocols in a same encapsulated protocol stack.

17. A non-transitory memory storing data, comprising:
a data structure stored in the memory, comprising:
a tree data structure emulating, on a network hardware device, a plurality of encapsulated protocol stacks emulating a plurality of network devices communicating with network hardware under test external to the network hardware device via a physical port of the network hardware device, the plurality of encapsulated protocol stacks comprising variable combinations of a plurality of encapsulation protocols, the tree data structure including:

a plurality of paths between a root node of the tree structure and leaf nodes of the tree data structure, such that paths of the plurality of paths emulate encapsulated protocol stacks of the plurality of encapsulated protocol stacks, and nodes along the plurality of paths emulate encapsulation protocols of the plurality of encapsulated protocol stacks, and said nodes are associated with sets of values specific to packet processing of particular encapsulation protocols of the variable combinations.

18. A network emulation system, comprising:

test equipment with a data processor, including program storage storing programs including instructions executable by the data processor, said instructions performing:

emulating, on the test equipment, a plurality of network devices with a plurality of encapsulated protocol stacks, the plurality of network devices communicating with network hardware under test external to the test equipment via a physical port on the test equipment, the plurality of encapsulated protocol stacks comprising variable combinations of a plurality of encapsulation protocols, the plurality of encapsulated protocol stacks emulated with a tree data structure including a plurality of paths between a root node of the tree structure and leaf nodes of the tree data structure, such that nodes along the plurality of paths emulate encapsulation protocols of the plurality of encapsulated protocol stacks, and said nodes are associated with sets of values specific to packet processing of particular encapsulation protocols of the variable combinations.

19. A non-transitory computer readable medium storing program instructions executed on a computer performing:

emulating, on a network hardware device, a plurality of network devices with a plurality of encapsulated protocol stacks, the plurality of network devices communicating with network hardware under test external to the network hardware device via a physical port of the network hardware device, the plurality of encapsulated protocol stacks comprising variable combinations of a plurality of encapsulation protocols, the plurality of encapsulated protocol stacks emulated with a tree data structure including a plurality of paths between a root node of the tree structure and leaf nodes of the tree data structure, such that nodes along the plurality of paths emulate encapsulation protocols of the plurality of encapsulated protocol stacks, and said nodes are associated with sets of values specific to packet processing of particular encapsulation protocols of the variable combinations.

* * * * *